(12) United States Patent
Whitman

(10) Patent No.: US 7,665,875 B2
(45) Date of Patent: Feb. 23, 2010

(54) ARTICULATING DENTAL OPERATORY LIGHT

(76) Inventor: Rick Whitman, 29128 SW. Egger Rd., Hillsboro, OR (US) 97123

( * ) Notice: Subject to any disclaimer, the term of this patent is extended or adjusted under 35 U.S.C. 154(b) by 168 days.

(21) Appl. No.: 12/035,329

(22) Filed: Feb. 21, 2008

(65) Prior Publication Data

US 2009/0215004 A1    Aug. 27, 2009

(51) Int. Cl.
*A61B 1/06* (2006.01)
(52) U.S. Cl. .................. 362/572; 362/421; 362/427; 600/248; 248/288.31
(58) Field of Classification Search ............. 362/572, 362/285, 287, 288, 401, 402, 419, 421, 425, 362/427; 600/248–249; 248/288.31, 288.51
See application file for complete search history.

(56) References Cited

U.S. PATENT DOCUMENTS

| | | | |
|---|---|---|---|
| 2,085,614 A * | 6/1937 | Stowick ................... 362/285 |
| 3,104,067 A * | 9/1963 | Stiffel ...................... 362/421 |
| 3,778,610 A * | 12/1973 | Wolf ........................ 362/418 |
| 4,254,454 A | 3/1981 | Hardin, Jr. |
| 4,254,455 A | 3/1981 | Neal, Jr. |
| 4,516,195 A | 5/1985 | Gonser |
| 4,608,622 A | 8/1986 | Gonser |
| 4,700,017 A * | 10/1987 | Morand ..................... 174/86 |
| 4,722,502 A * | 2/1988 | Mueller et al. ........... 248/284.1 |
| 4,837,668 A | 6/1989 | Koehler |
| 5,086,379 A | 2/1992 | Denison et al. |
| 5,132,492 A * | 7/1992 | Wieder ...................... 174/535 |
| 5,393,796 A | 2/1995 | Halberstadt et al. |
| 5,473,524 A | 12/1995 | Behringer |
| 6,793,380 B2 * | 9/2004 | Kupfer ....................... 362/371 |
| 7,055,247 B2 | 6/2006 | Kaposi et al. |
| 7,156,358 B2 | 1/2007 | March et al. |

* cited by examiner

*Primary Examiner*—Jong-Suk (James) Lee
*Assistant Examiner*—Julie A Shallenberger
(74) *Attorney, Agent, or Firm*—Miller Nash LLP

(57) ABSTRACT

An articulating dental operatory light having an electrically powered light source and a mounting assembly with at least a ball and socket joint, and optionally an additional joint, for multi-axial and multi-directional positioning and adjusting of the lamp head assembly, and a rotational stop for preventing damage to electrical wires passing through the joints. The rotational stop comprises a keyed shaft containing the electrical wires, that cooperates with the ball portion of the joint, and a first stop member connected to a remote end of the keyed shaft that interferes with a second stop member, thereby preventing a full 360 degree rotation of the ball portion relative to the socket member of the joint and minimizing twisting damage to the electrical wires.

20 Claims, 7 Drawing Sheets

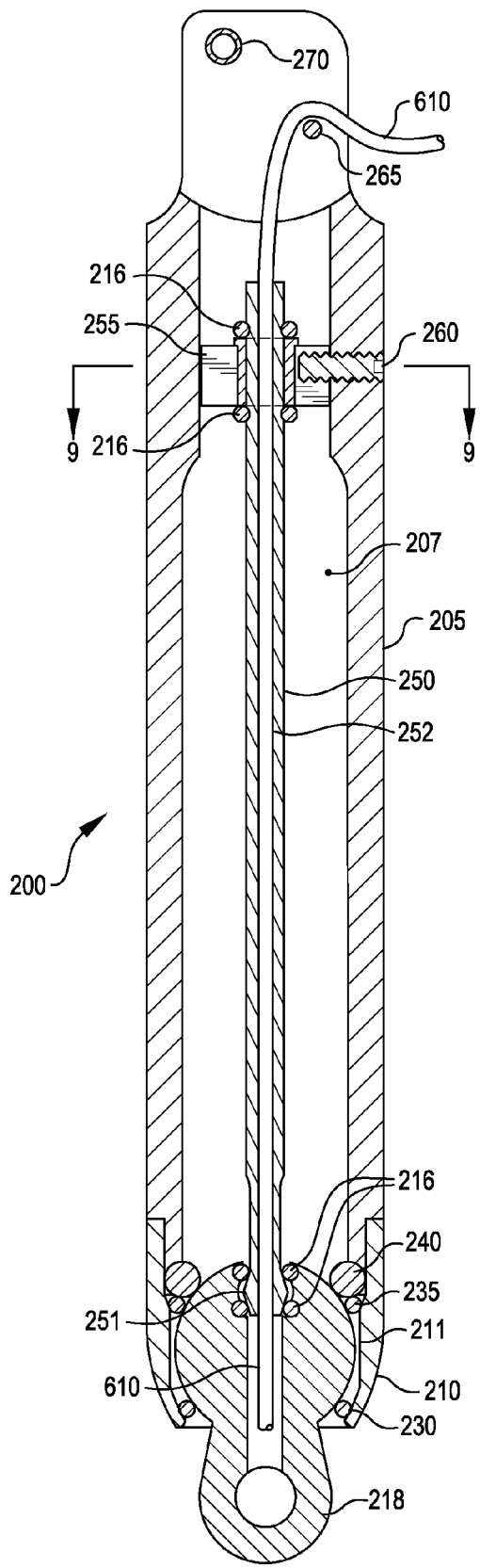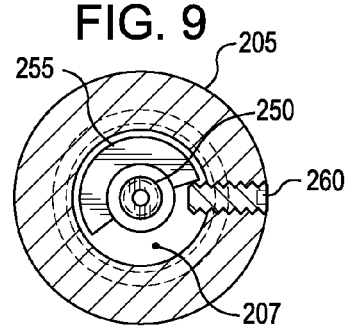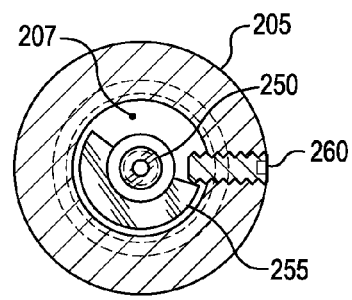

ARTICULATING DENTAL OPERATORY LIGHT

FIELD OF INVENTION

The present invention relates generally to electrical lighting fixtures. More specifically, the present invention is directed to a compact articulating dental operatory light having a mounting assembly with a ball and socket joint, and optionally additional joints, for multi-axial and multi-directional positioning and adjusting of the light, and a rotational stop for preventing damage to electrical wires passing through the joint.

BACKGROUND OF THE INVENTION

Lighting devices are commonly used in modern dental practice, as well as in medical, veterinary and like fields, to provide a desired pattern of illumination on an area under study or examination. The quality of the light provided is of critical importance to a user of such lighting devices, particularly when the illumination provided impacts the quality of diagnostic and treatment procedures performed on a human or animal subject. It is highly desirable to have a lighting device that provides and mimics pure white light at an acceptable and useful color temperature.

Dental operatory lights are well known in the prior art, many of which utilize a high intensity gas-filled bulb such as a halogen or xenon bulb to produce a light of acceptable quality. Many of these lights utilize a reflector of a predetermined shape to produce the desired pattern of illumination. The reflector typically incorporated into these lights is oftentimes formed of glass with a selective coating on the reflector surface that acts to filter out UV, infrared and other undesirable light energy from the light spectrum produced from the light bulb, and allows for the reflected light to be cooler for minimization of subject desiccation and discomfort. The filtered light energy is absorbed by or passes through the reflector. Therefore, these high intensity bulbs and reflectors, allowing a certain portion of light energy to pass through, work together to produce the required color of acceptable quality. A typical high intensity bulb with a reflector can produce a 5,000 degree Kelvin color temperature and a 25,000 lux light output that requires approximately 90 watts of power.

Dental operatory lights of this type commonly have a lamp head assembly having a housing containing a light emitting bulb, the bulb usually being retained in a bulb socket, a reflector, a lens covering the bulb and reflector, and electrical wiring for providing electrical current to the bulb. It is desirable that the lamp head assembly be maximally positionable and adjustable for directing the light pattern to a focal point on a particular subject. Handles are commonly used in the prior art to facilitate manipulation of the lamp head by a user, however, the handles are commonly attached as separate pieces to the lamp head housing.

Because the higher intensity bulbs in these lights produce higher amounts of heat, including that produced by the light energy absorbed by and passing through the reflector, various means of eliminating the heat have been provided in the prior art. Some lighting devices utilize motorized cooling fans while others allow for self-ventilation. A problem remains in that heat typically radiates through all portions of the lamp head assembly, including the handles, which can get uncomfortably hot for a user. It is therefore desirable to have handles for a dental operatory light that can provide a comfortable grip in the presence of high temperatures which are simple and economical to manufacture.

Many dental lights of the prior art include a system of articulating arms or booms attached to the lamp head to enable multi-axial positioning of the light pattern onto a desired location. Knuckles with limited motion are commonly provided for coupling a lamp head assembly to an arm member, and for coupling arm members end-to-end, thereby enabling the lamp head assembly to be raised, lowered, swiveled, tilted, rotated, and moved closer to or further from the subject. Dental light arms and booms of the prior art often require a complex structural framework in order to temporarily and stably fix the lamp head in a desired position and to withstand the weight of the lamp light assembly once it has been adjusted on a focal point of the subject. Friction discs, gears, springs and screw-type tensioners have been used to fix the various pivot points. Larger lamp heads require more substantial arms and booms to support and maintain positioning of the added weight and are cumbersome for swift handling.

A problem exists in that heat from the lamp head radiates through the lamp head housing, consequently into adjoining knuckle and arm members. Temperatures can rise dramatically when the light is turned on and the bulb is energized, and drop back down to an ambient temperature when the light is turned off and the bulb is de-energized. Temperature extremes are well known to cause structural changes in previously known knuckle couplers, resulting in fatigue. The repeated fatigue from extreme temperature changes ultimately results in failure in ability to maintain sufficient friction and sustain functionality between moving parts that would otherwise keep the lamp head in a desired position. This problem is exacerbated when temperature extremes are combined with usual wear and tear associated with routine manipulation and repeated adjustment of the lamp head, and knuckle and arm members.

Ball and socket joints are well known in the prior art, and are capable of providing multi-axial movement of a ball member relative to a socket member. A ball and socket joint has not been adopted into lighting devices, particularly dental or medical operatory lighting. A ball and socket joint in conjunction with an optional, additional joint for infinite positioning and manipulation of the lamp head is necessary to allow maximum freedom of light adjustment and overcoming the previous problems inherently caused by high intensity lighting. Combining a ball and socket joint, with optionally at least a second joint, for infinite positioning of the lamp head, is desirable to facilitate repetitive lamp head assembly use for diagnostic and treatment procedures. Repeated movement of the light with wiring passing through the interior space of the mounting system results in shearing or internal breakdown of conductors within the wire of electrical cables which can render the light inoperable and also present a fire hazard. It is therefore desirable to have a rotational stop for a ball and socket joint within the mounting system that would prevent damage to internal wiring without requiring added bulk and weight of associated lamp arms and knuckles, while providing means for maximal and repetitive adjustment of the light over an extended period of use.

BRIEF SUMMARY OF THE INVENTION

The above-described problems are solved and a technical advance achieved by the present articulating dental operatory light. The present light provides a compact and durable design with improved features for reducing size, weight and the number of parts required for manufacturing. Its features, particularly an improved articulating drop knuckle assembly with a rotational stop for prevention of damage to internal wiring with one or more joints at the attachment of the lamp head assembly, offer numerous advantages over traditional dental or diagnostic operatory lighting systems. The advantages stem mostly from simplification of construction using common materials and from design features that minimize the number of working parts, extend the useful life of the light, and allow maximal adjustment of the light, greatly contributing to performance and value to users.

An articulating dental operatory light is disclosed having an electrically powered light source and a mounting system with at least one ball and socket joint for multi-axial and multi-directional positioning of the light and a rotational stop for preventing damage to electrical wires passing through the ball and socket joint. The rotational stop comprises a keyed shaft containing the electrical wires, that cooperates with the ball member of the joint, and a first stop member connected to a remote end of the keyed shaft that interferes with a second stop member, thereby preventing a full 360 degree rotation of the ball member relative to the socket member of the joint and minimizing twisting damage to the electrical wires.

The articulating dental operatory light is also disclosed having an electrically powered light source and a mounting system with two joints, including a ball and socket joint and another pivoting joint, at the attachment of the lamp head assembly to a drop knuckle assembly for even greater multi-axial and multi-directional positioning and adjusting of the light, and a rotational stop for preventing damage to electrical wires passing through the joints.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

The invention is better understood in view of the accompanying drawing figures, in which like reference numerals refer to like elements throughout the following detailed description of the invention section, and in which:

FIG. 8 is a side sectional view of an articulating drop knuckle assembly of the present invention, showing details of the rotational stop.

FIG. 9 is a cross-sectional end view of an articulating drop knuckle assembly of the present invention, showing the rotational stop in a first extreme position.

FIG. 10 is a cross-sectional end view of an articulating drop knuckle assembly of the present invention, showing the rotational stop in a second extreme position.

DETAILED DESCRIPTION OF THE INVENTION

Figure 1:
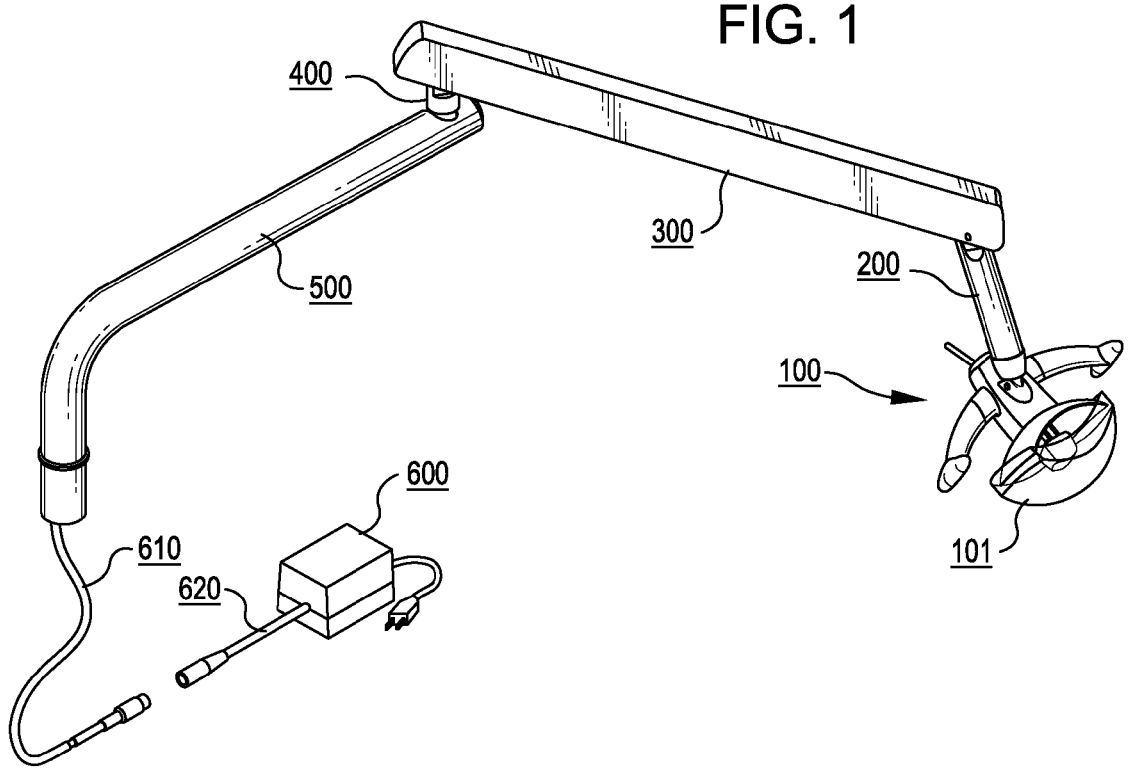
FIG. 1 is a perspective view of a dental operatory light of the present invention shown mounted to a drop knuckle assembly and an extension arm.

FIG. 1 shows an example of a complete dental operatory light having a lamp head assembly 100 providing a light source 101 supported on a drop knuckle assembly 200, which is in turn attached to a flex arm assembly 300. The flex arm assembly 300 is attached to a rigid knuckle assembly 400, which is then attached to a rigid arm assembly 500. The rigid arm assembly 500 is mountable to any supporting base, such as a floor stand, wall mount, table mount, floor mount, or equipment mount as is commonly known and understood in a dental operatory setting. Also shown in FIG. 1 is an electrical cable 610 that is connectable to a transformer cable 620, which feeds electrical current from an A.C. powered electrical power transformer 600.

Figure 2:
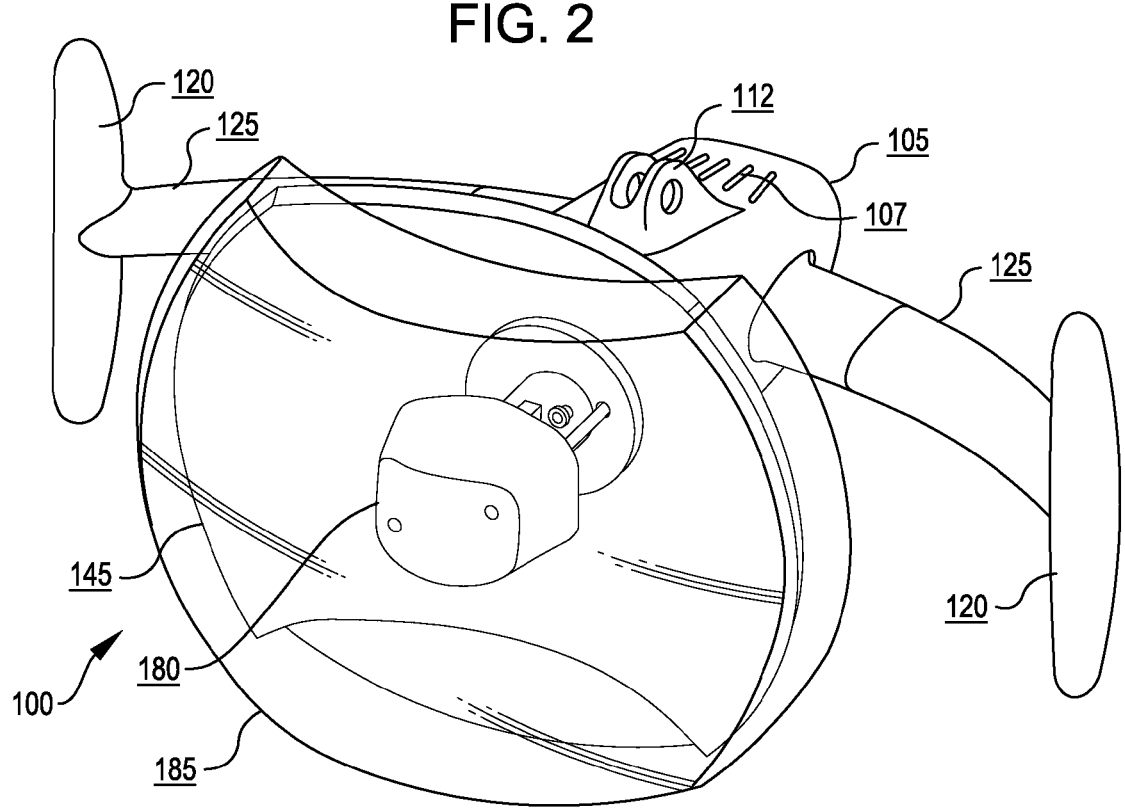
FIG. 2 is a perspective view of a lamp head assembly of the present invention.

FIG. 2 shows an example of a complete lamp head assembly 100. A lamp housing 105 is provided that can be cast of metal or other heat-resistant material, molded in a single piece to simplify construction. Vent openings 107 are molded or machined into the lamp housing 105 to provide ambient air flow for controlling the internal temperature of the lamp head assembly 100. This example also has lamp handles 120 on either side of the lamp housing 105 that allow a user to grasp the lamp head assembly 100 for manual manipulation to a desired position. Lamp handles 120 can either be constructed integral with the lamp housing 105 to minimize the number of parts required for construction, or could be attached as separate pieces. In this example, the lamp handles 120 are provided with an overmolding 125 of heat insulating material to prevent discomfort and possible injury to a user who touches the lamp handle 120 when the temperature is high due to heat from the light source 101. A possible material for the overmolding 125 is santoprene; other similar heat insulating materials can be used.

Figure 3:
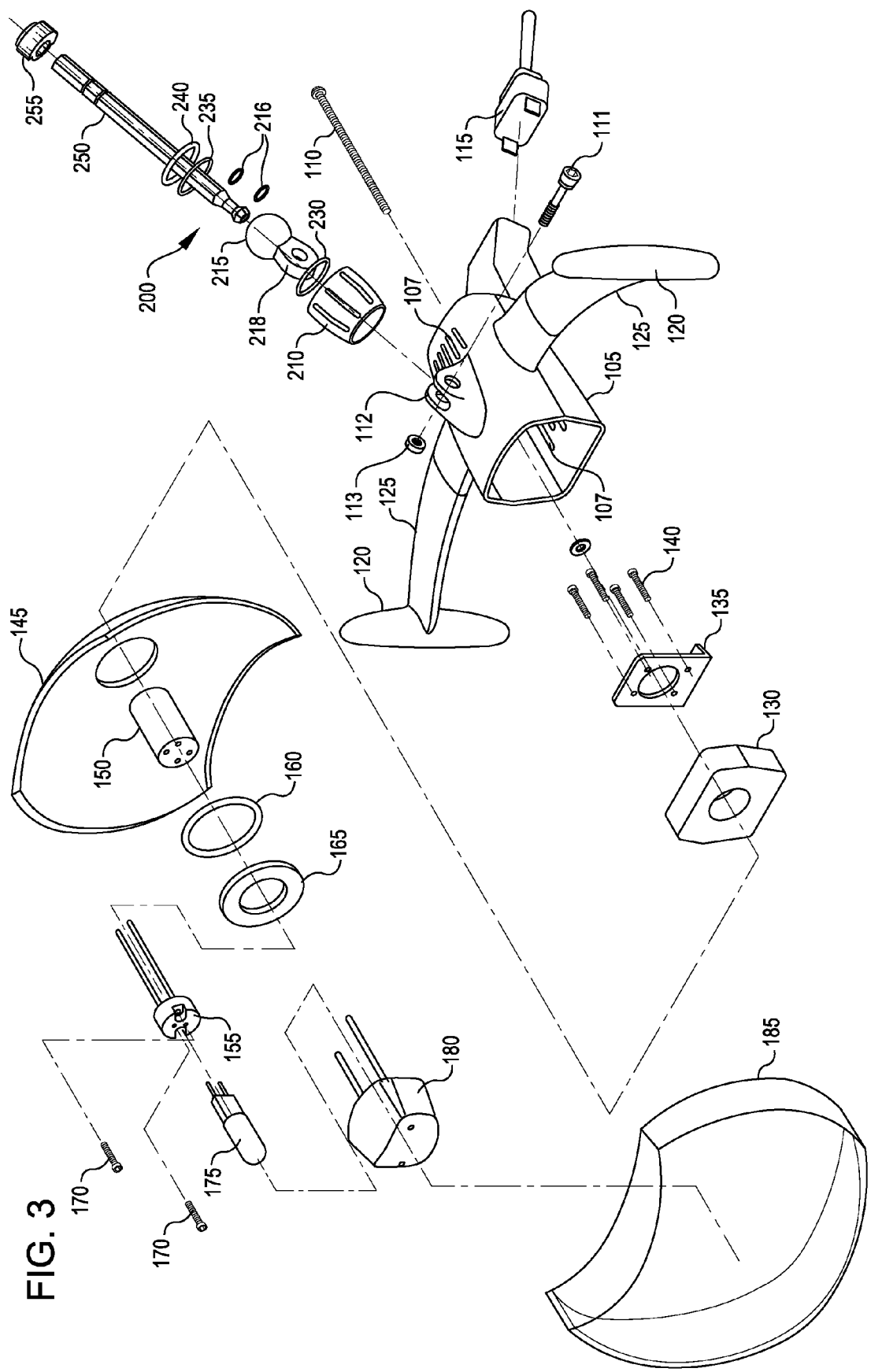
FIG. 3 an exploded perspective view of a lamp head assembly of the present invention.

The light source 101 in this example is shown in detail in FIG. 3 in an exploded view, and can be best understood with reference to the complete lamp head assembly 100 in FIG. 2. The lamp housing 105 houses the internal components of the lamp head assembly 100, which include a heat plug 130 made of heat-resilient material, such as a silicon insulator, that is supported by a support member 135, which is fastened to the heat plug 130 using common fasteners 140. The support member 135 can be made of metal or other durable materials. The support member 135 is fastened to an inner surface of the lamp housing 105, or can be formed as part of or integrated into the lamp housing 105. The light reflector 145 is concavely shaped and has a light reflective surface near the light emitting bulb 175 for reflecting a substantial portion of visible light from the bulb 175 in a predetermined pattern and allowing infrared and other undesirable energy to pass through the reflector 145. The light reflector 145, particularly the light reflective surface, is coated with dichroic or other similar optical materials. A dichroic or optical coating on the light reflective surface of the reflector 145 is one possible way to obtain the desired light reflection. The light reflector 145 is supported by the support member 135. The light reflector 145 is attached to the support member 135 by way of the heat plug 130 on its back side, and is held in place by a reflector clamp 165, typically made of a heat-resistant material such as Teflon®, which is insulated from direct contact with the reflector 145 with a heat-resistant O-ring 160. Another possible material for the reflector clamp 165 is aluminum with anodized finish; other light-weight metal or similar materials can be used with or without anodizing. A bulb socket holder 150 is held within an aperture of the heat plug 130 and supports a bulb socket 155. The bulb socket 155 is attached to the bulb socket holder 150 with common fasteners 170 such as machine screws, and the bulb socket 155 in turn holds a light emitting bulb 175. A lamp housing fastener 110 secures the lamp head assembly 100 together, and can be a long machine screw that extends from the rear of the lamp housing 105, through the support member 135, and engages with the heat plug 130.

As is commonly known in the industry for exam or diagnostic lights for medical, dental and veterinary applications, the light bulb 175 and dichroic reflector 145 in combination provide a high quality and high intensity light. In one example, this light quality is specified at 5,100 Kelvin color temperature, with approximately 23,000 lux at 95 watts of power. Dental operatory lights typically use a coated reflector to filter UV and infrared light out of the spectrum emitted by a light bulb 175. The dichroic reflector 145 in the present example allows reflection of a desired wavelength of light emitted by the light bulb 175, while allowing undesired UV and infrared light, as well as heat, to pass through the reflector surface. A glare guard 180 is supported by the bulb socket holder 150. A glare guard 180 is made of a heat-resistant material such as Teflon® for blocking light emitted directly from the light bulb 175 from the light beam pattern produced by the light source. Another possible material for the glare guard 180 is steel with a high-temperature paint finish; other metal or similar materials can be used for this purpose. A lamp shield 185 made of a clear heat-resistant material, such as a clear high-temperature plastic, attaches to outer edges of the reflector 145 and protects the reflector 145 from damage while preventing a user from inadvertently touching a hot surface of the reflector. The lamp shield 185 easily and removably snaps on and over the outer edges of the reflector 145. The shield 185 is easily removable to allow cleaning and replacing a light bulb 175 from the lamp head assembly 100.

An electrical cable 610 (not shown) is attached to leads on the bulb socket 155 by way of a power switch 115, for providing electrical current to the light bulb 175. The power switch 115 can be any electrical switch for selectively switching the light bulb 175 on and off, and optionally for providing selection of a high-intensity, low-intensity or off position. Therefore, a power switch 115 may provide for variable intensity settings. The power switch 115 as shown in FIG. 3 is mounted within a rear portion of the lamp housing 105 and has an elongated actuator toggle arm that outwardly extends from the rear for easy access by a user. The side, cross-sectional view of the power switch 115 with the elongated actuated toggle arm can be easily seen in FIG. 4.

A drop knuckle assembly 200 is an articulating mount that pivotally attaches to a drop knuckle receiver 112 on the lamp housing 105 of the lamp head assembly 100. The drop knuckle assembly 200 attaches to the lamp head assembly 100, particularly the bottom attachment portion 218 of the ball member 215 which attaches to the drop knuckle receiver 112. More specifically, the attachment portion of the ball member 215 fits with the drop knuckle receiver 112 and is held in place by a common pivot screw 111. This first joint allows a pivotable movement of the lamp head assembly 100 at the attachment point between the drop knuckle assembly 200 and the lamp head assembly 100. In the examples of FIGS. 2-3, the drop knuckle receiver 112 is a raised triangular shape with enough inner spacing to accommodate and to receive the attachment portion 218 of the ball member 215, and both the drop knuckle receiver 112 and the attachment portion 218 have a similarly sized aperture through which a common pivot screw 111 fits to pivotally attach the lamp head assembly 100 to the drop knuckle assembly 200. Any pivotable attachment arrangement can be adopted and is not specifically limited to the examples in FIGS. 3-4 for allowing pivotable movement at the attachment between the drop knuckle assembly 200 and the lamp head assembly 100.

The drop knuckle assembly 200 further comprises a ball and socket joint made up of a tensioning collar 210 that forms a socket member 211 (shown in FIG. 5) in the interior of the collar 210 to hold a ball member 215 providing a rotatable, second range of movement of the lamp head assembly 100 near the attachment point formed by the drop knuckle receiver 112. By using at least one, and preferably more, O-rings, 230, 235 over the ball member 215 and between the ball member 215 and the socket member 211, a smooth surface is created within the collar 211 for the ball and socket joint. In one example, a first O-ring 230 and second O-ring 235 are PTFE O-rings to provide friction adjustability and smoothness to the motion of the ball member 215 against the socket member 211 within the collar 210 for easy adjustment and smooth operation of the lamp head assembly 100. Optionally, the ball member 215 is also backed with a high durometer silicone tensioning O-ring 240 for providing spring tension against the ball relative to the socket joint. The tensioning O-ring 240 can be made or formed of any compressible, high-durometer, heat-resistant material. The tensioning O-ring 240 is located and positioned within the interior space of the drop knuckle assembly 200, particularly the tensioning collar 210, for communicating with the ball member 215 to provide tension adjustment between the ball member 215 and the socket member 211.

A link shaft 250 is an elongated rod having a first top end and a keyed bottom end, and a hollow center for allowing passage of an electrical cable 610 (not shown), which provides electrical current to the lamp head assembly 100. The link shaft 250 is retained within a recess in the ball member 215 by common retaining rings 216, and the keyed bottom end keys in to the aperture 220 of the ball member 215 to cooperate with rotation of the ball member 215. A rotational stop 255 is attached to the link shaft 250 and rotates along with rotation of the ball member 215 and the link shaft 250 as more clearly demonstrated in FIGS. 8-10.

Figure 4:
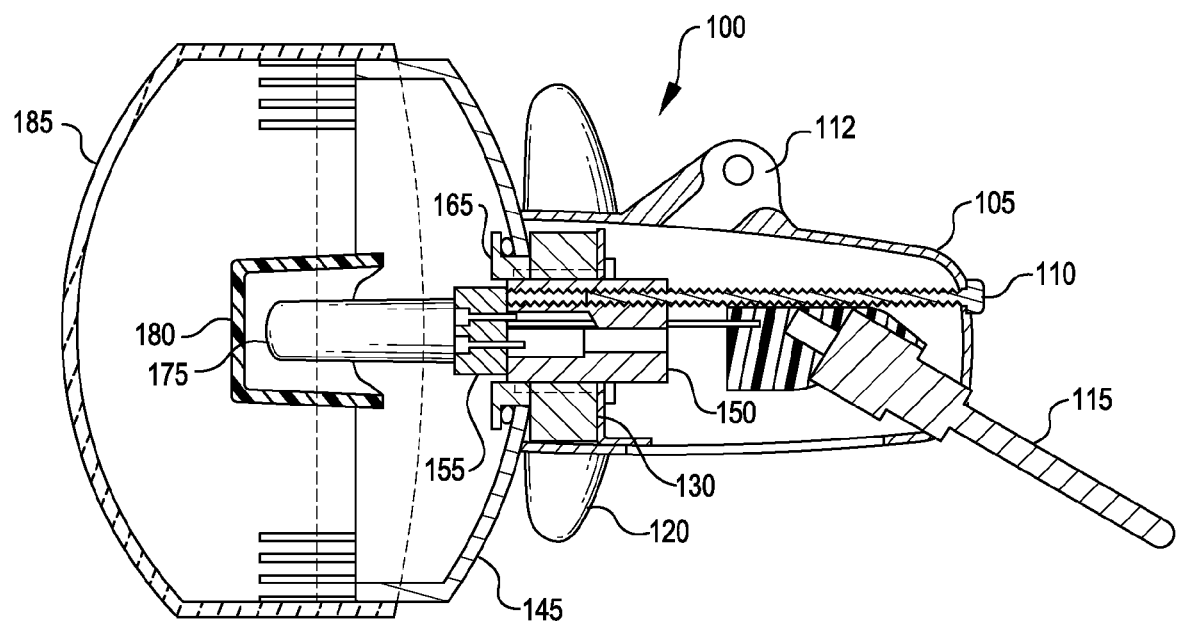
FIG. 4 cross-sectional view of a lamp head assembly of the present invention.

FIG. 4 provides a detailed cross-sectional side view of one example of a lamp head assembly 100 and shows one possible orientation and assembly of the lamp housing 105, lamp housing fastener 110, drop knuckle receiver 112, power switch 115, lamp handle 120, heat plug 130, reflector 145, bulb socket holder 150, bulb socket 155, reflector clamp 165, bulb 175, glare guard 180, and lamp shield 185. This configuration allows for a smaller than normal rear profile, thereby limiting the area on which the radiated heat is absorbed. A lamp produced in this manner using a one-piece lamp head design is simpler and more cost effective to produce and manufacture than traditional dental or diagnostic operatory lighting systems. A simple one-piece design can be produced that has a die cast housing with integrated handles and greatly reduces the number of parts necessary compared to traditional lamp systems.

Figure 5:
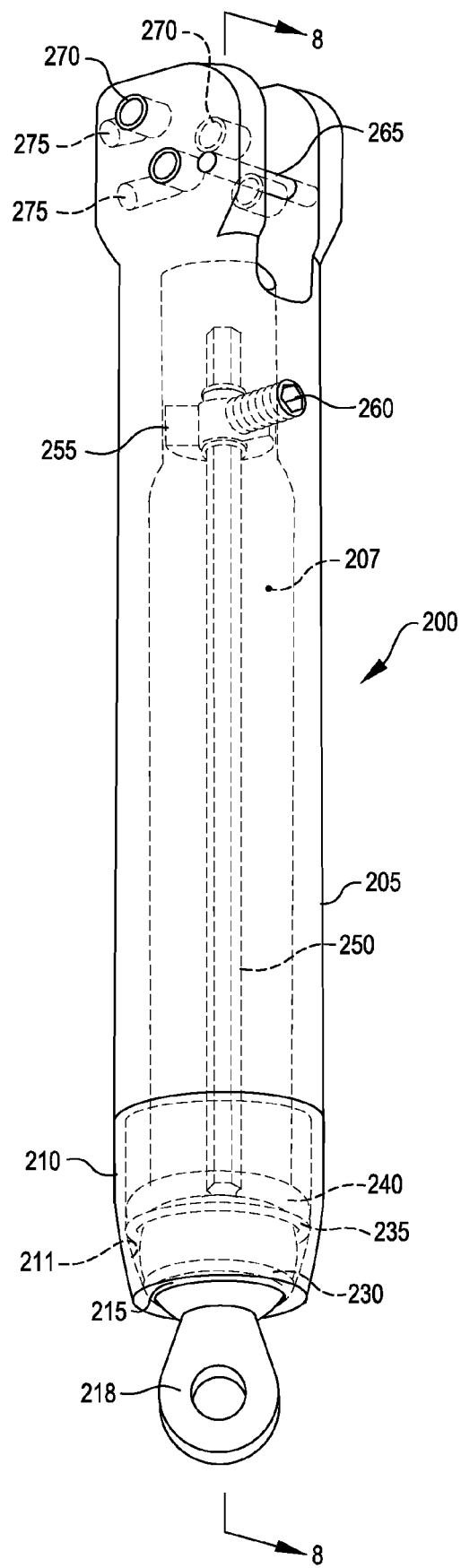
FIG. 5 is a perspective view of a drop knuckle assembly of the present invention, showing details of internal elements.
Figure 6:
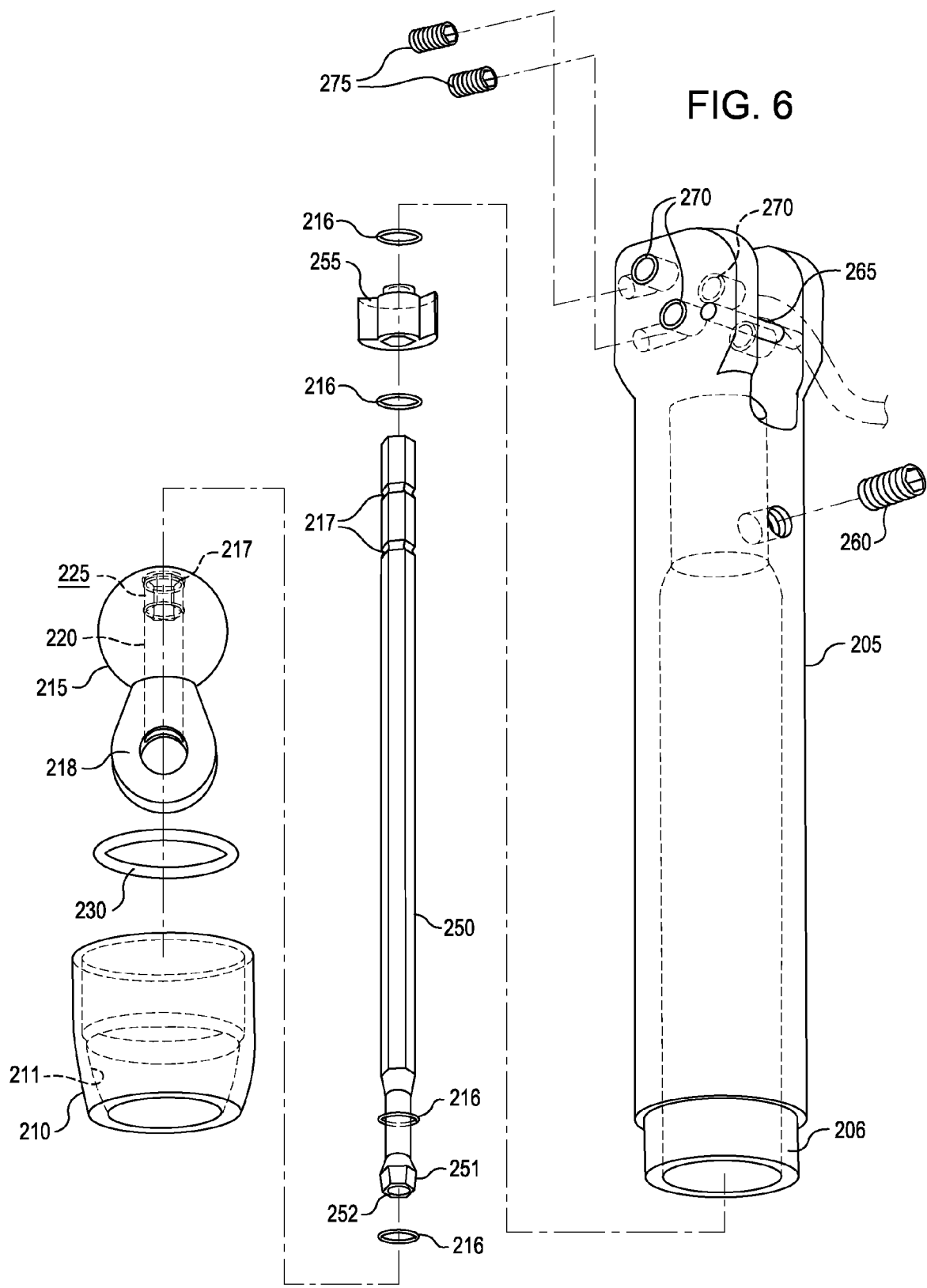
FIG. 6 is an exploded view of an articulating drop knuckle assembly of the present invention.

One example of an articulating mount for supporting the lamp head assembly 100 is a drop knuckle assembly 200 as shown in FIGS. 5 and 6. The ball and socket joint and other internal components are contained within an interior space 207 within a drop knuckle housing 205, which can be formed of any machined or cast metal, such as aluminum. Other similarly light-weight metal materials may be used to form the housing 205. The drop knuckle housing 205 has a circular end 206 that attaches to the tensioning collar 210 covering the link shaft 250 and the ball and socket joint within the housing 205. In this example, the circular end 206 of the drop knuckle housing 205 removably and adjustably attaches to the tensioning collar 210 by a threaded connection. Adjusting or twisting of the tensioning collar 210 over the circular end 206 of the knuckle housing 205 adjusts tension of the collar 210 between the ball member 215 and the socket member 211.

The ball member 215 is multi-directionally pivotable and rotatable on any axis relative to the socket member 211 which is formed on the inside of the tensioning collar 210. The ball and socket joint allows a first wide range of movement of the lamp head assembly 100 when attached to the drop knuckle assembly 200. The ball member 215, as shown in detail in FIG. 7, has a bottom attachment portion 218 that attaches to the drop knuckle receiver 112. The drop knuckle receiver 112 is located on top and integrated as part of the lamp head assembly 100. The attachment portion 218 of the ball member 215 fits within the drop knuckle receiver 112 located on top of the lamp head assembly 100 for attaching the two assemblies 100, 200 together. The combination of the attachment portion 218 and the drop knuckle receiver 112 is held together by a common pivot screw 111 that fits through aligned apertures to allow yet another range of movement of the lamp head assembly 100 at the attachment point. Essentially, the drop knuckle assembly 200 is doubled-jointed at the attachment of the drop knuckle assembly 200 to the lamp head assembly 100 to provide a wider range of movement and use of the lamp head assembly 100.

Figure 7:
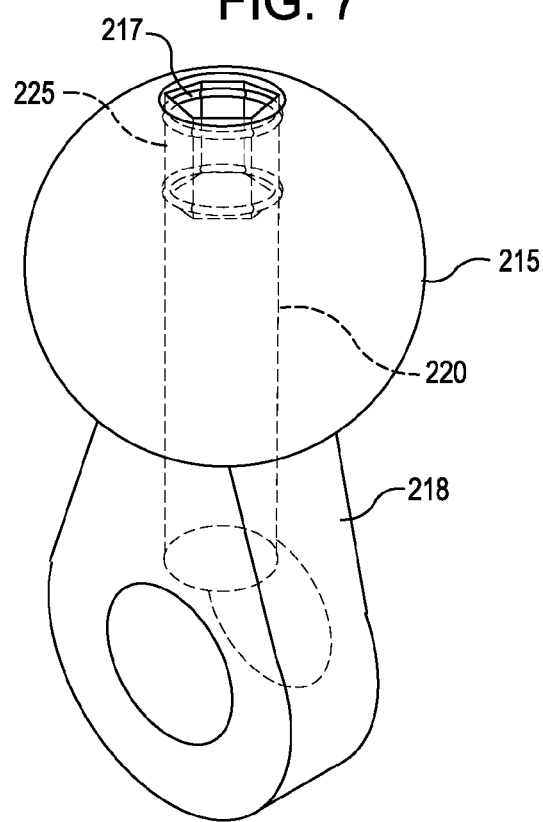
FIG. 7 is a perspective view of a ball member forming a ball and socket joint for a drop knuckle assembly of the present invention.

As shown in FIGS. 6-8, the ball member 215 has an aperture 220 through the ball member center on an axis passing through the center of the aperture 220 in the attachment portion through which an electrical cable 610 can pass that runs from an A.C. powered electrical power transformer 600 to the light source 101 to provide power. The vertical aperture 220 of the ball member 215 has two ends. The first end of the ball member 215 is shaped as a keyed socket 225 which receives and accommodates a corresponding keyed ball end 251 of the link shaft 250. One example of corresponding keyed surfaces is a hexagon-shaped keyed recess 217, such as a keyed socket 225 of the aperture 220 through the ball member 215, and a ball end 251 on the link shaft 250, the ball end 251 having a hexagon-shaped cross-section. Other polygonal shapes of link shaft can be used. The ball end 251 has polygonal faces diametrically circumscribed around a portion of the ball end 251. The ball end 251 allows for various angular positioning of the link shaft 250 while retaining an identical rotational and multi-directional position with that of the ball member 215 of the ball and socket joint. The ball end 251 of the link shaft 250 provides for a universal joint wherein the link shaft 250 and the ball end 251 are rotatably coupled independent of axial alignment of the link shaft 250 and the ball end 251 with the axis of the aperture 220. The ball end 251 of the link shaft 250 is retained within the keyed socket 225 of the vertical aperture 220 by two retainers 216, such as split-ring retainers, that are each held within a keyed recess 217 formed within the key socket 225. The keyed recess 217 is defined by the aperture 220 through the ball member 215.

As shown in FIG. 6, a first rotational stop member 255, is attached towards an end of and around the link shaft 250 that is remote and opposite in direction from the ball member 215. More specifically, the rotational stop member 255 can slide over and around the link shaft and the rotational stop member 255 is held in place by retainers 216 securely fastened to retainer recesses 217 at opposite ends of the rotational stop member 255 on the link shaft 250. The first rotational stop member 255 has at least one radially projecting positive stop surface that is circumferentially oriented to limit highly angular and continuous rotational travel of the link shaft 250. The rotational travel of the link shaft 250 is limited by interfering with and hitting against at least one second stop member 260 that is placed inwardly projecting into the interior space 207 of the drop knuckle housing 205. In one example as shown in the cross-section of the drop knuckle assembly 200 in FIGS. 8 through 10, the interior space 207 within the drop knuckle housing 205 whereby the first rotational stop member 255 can move freely around and about the link shaft 250, a protruding second stop member 260 is shown. A second stop member 260 can be a pin, set screw or other protrusion into the interior space 207 of the knuckle housing 205 that interferes with and hits against one or other positive stop surfaces of the first stop member 255 as more readily demonstrated in FIGS. 9 and 10. The rotation stop member 255 and the second stop member 260 provide pivotable and rotatable movement of the link shaft 250 without allowing the link shaft 250 and the lamp head assembly 100 to rotate more than permitted by the stop members 255, 260 which limit rotation to less than 360 degrees.

A link shaft aperture 252 from FIG. 6 extends through the length of the link shaft 250, and allows for passage of an electrical cable 610 through the link shaft 250 and the ball member 215 as shown in FIG. 8. The electrical cable 610 is thereby protected within the link shaft 250. Additionally, the rotational stop mechanism prevents the electrical cable 610 from twisting excessively with the rotation of the lamp head assembly 100, which reduces the likelihood of damage to internal conductors within the electrical cable 610. The lamp head assembly 100 in this example is infinitely articulating with respect to the drop knuckle assembly 200 within the range of motion allowed using the ball and socket joint, optionally an additional joint, and the rotational stop mechanism. The ball member 215 is freely rotatable within the range of rotation permitted by the stop members 255, 260 which limit rotation to less than 360 degrees.

The drop knuckle assembly 200 is also provided with a positional connection end for mounting to extension arms and/or booms. In one example as shown in FIG. 1, the drop knuckle assembly 200 attaches to a flex arm assembly 300. The flex arm assembly 300 enables upward and downward positioning of the lamp head assembly 100 and the drop knuckle assembly 200. In this example, and as detailed in FIGS. 5, 6 and 8, the end of the drop knuckle assembly 200 furthest from the ball and socket joint has openings lined with bushings 270 secured with fasteners 275 for providing a hinged connection with a flex arm assembly 300. A roll pin 265 supporting the electrical cable 610 prevents the cable 610 from entangling in the hinged connection.

Figure 11:
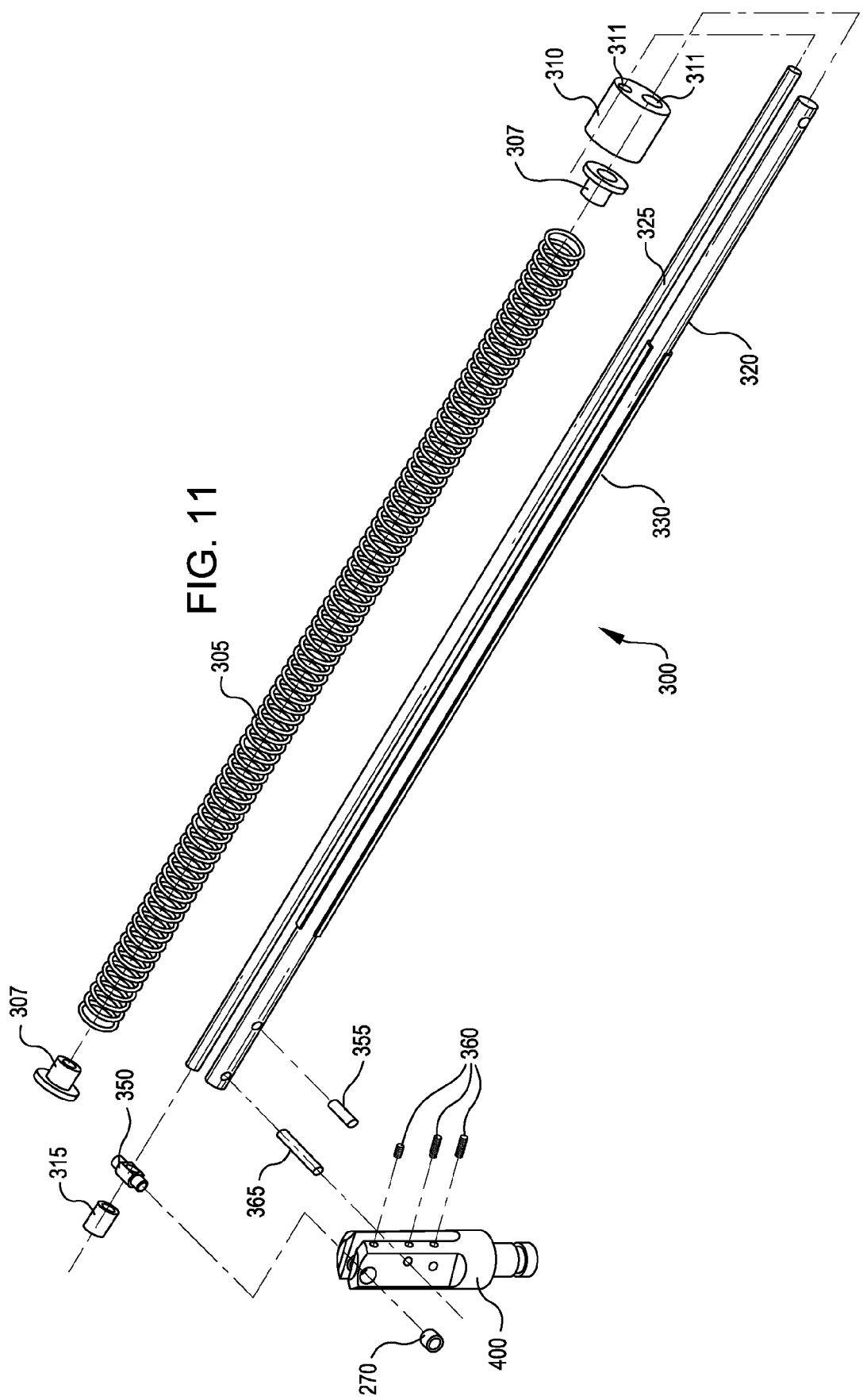
FIG. 11 is an exploded view of an extension arm for attachment to an articulating drop knuckle assembly and light head assembly of the present invention.

The internal components of a flex arm assembly 300 are shown in FIG. 11. In this example, a rod 320 extends the length of the flex arm assembly 300 and connects at one end by a hinge pin to the drop knuckle assembly 200 through the drop knuckle bushings 270, and at the other end by a hinge pin through the bushings 270 in a rigid knuckle assembly 400. The rigid knuckle assembly 400 is rotatably mounted to a rigid arm assembly 500 which is mountable to a surface or stand. A spring 305 encircles the length of the rod 320 and is supported at either end by a spring guide 307, each of which has an opening allowing for passage of the rod 320. A split tubing 330 covers the rod 320 and provides support for the center portion of the spring 305. A slider block 310 has two openings 311 which accommodates the drop knuckle end of the rod 320 and the end of a threaded rod 325. The threaded rod 325 passes through a trunnion 350 held within the rigid knuckle assembly 400. Together with a spring adjuster 315 threaded onto the threaded rod 325 outside of the truinonn 350, the threaded rod 325 provides a means of adjusting tension on the flex arm assembly 300 so that it retains an assumed position when the lamp head assembly 100 is repositioned or adjusted by a user.

INDUSTRIAL APPLICABILITY

The present invention has applicability to the field of electrical lighting fixtures, and more particularly to a compact articulating dental operatory light having a mounting system with a ball and socket joint for multiple axis positioning of the light, and a rotational stop for preventing damage to electrical wires passing through one or more joints.

In compliance with statute, the invention has been described in language more or less specific as to lighting and associated mounting devices. It is to be understood, however, that the invention is not limited to the specific means or features shown or described, since the means and features shown or described comprise preferred ways of putting the invention into effect.

While this invention is described in terms of its being used for a dental operatory light, it will be readily apparent to those skilled in the art that the invention can be adapted to other uses for other forms of lighting and light mounting devices as well, and therefore the invention should not be construed as being limited to dental operatory lighting. The invention is, therefore, claimed in any of its forms or modifications within the legitimate and valid scope of the appended claims.

What is claimed is:

1. An articulating dental operatory light comprising:
a) an electrically powered light source;
b) an articulating mount having a mount housing and an interior space within the mount housing;
c) a ball member engageable with the electrically powered light source and contained within the mount housing;
d) at least one aperture extending through the ball member;
e) at least one electrical cable disposed within the at least one aperture;
f) a socket member contained within the mount housing, the socket member pivotally and rotatably cooperating with the ball member, whereby the ball member is pivotable on multiple axes relative to the socket member and is rotatable relative to the socket member;
g) a link shaft having a first end and a keyed second end;
h) a keyed recess defined by the aperture through the ball member, the keyed recess being engageable with and cooperating with the keyed second end of the link shaft;
i) a first rotational stop member connected to the first end of the link shaft at a location remote from the ball member and socket member; and
j) a second rotational stop member located within the mount housing, the second stop member positioned and adapted to interfere with the first rotational stop member whereby rotation of the first rotational stop member, and correspondingly the ball member, about a longitudinal axis of the link shaft is limited by the interference between the first rotational stop member and the second rotational stop member, thereby minimizing twisting damage to the at least one electrical cable.

2. The articulating dental operatory light of claim 1, wherein the electrically powered light source is a lamp head assembly, the lamp head assembly further comprising a lamp housing, at least one handle integral with the lamp housing and overmolded with a heat-insulating material, a reflector connected to the lamp housing, and a light bulb supported by the lamp housing and mounted in front of the reflector.

3. The articulating dental operatory light of claim 2, wherein the ball member further comprises an attachment portion that is engageable with a receiver of the lamp head assembly forming at least a second joint whereby the lamp head assembly is additionally pivotable and adjustable.

4. The articulating dental operatory light of claim 1, wherein temperature of the light source is controlled by ambient air flow through a plurality of vent openings in the light source.

5. The articulating dental operatory light of claim 1, wherein the link shaft keyed second end is polygonal in cross-section and fits within an aperture of the ball member, thereby forming a universal joint wherein the link shaft and the ball member are rotatably coupled independent of axial alignment of the link shaft and the ball member.

6. The articulating dental operatory light of claim 1, wherein the socket member further comprises a tensioning collar adjustably engageable with the mount housing, whereby a desired tension between the ball member and the socket member is adjustable.

7. The articulating dental operatory light of claim 1, wherein the socket member further comprises at least one O-ring engaging the ball member disposed within the interior space of the mount housing, the O-ring being formed of a high-strength, low-friction material, whereby smooth travel is allowable by the ball member within the socket member.

8. The articulating dental operatory light of claim 1, wherein the first rotational stop member further comprises at least one radially projecting surface, and the second rotational stop member located on the mount housing is an inward projection engageable with the at least one radially projecting surface, whereby rotation of the first rotational stop member about the longitudinal axis of the link shaft is limited by the interference between the at least one radially projecting surface and the inward projection.

9. The articulating dental operatory light of claim 1, further comprising at least one flex arm assembly pivotally coupled to the mount housing for providing vertical position adjustment of the light source.

10. An articulating dental operatory light comprising:
a) a lamp head assembly further comprising a lamp housing, at least one handle integral with the lamp housing and overmolded with a heat-insulating material, a reflector connected to the lamp housing, and a light bulb supported by the lamp housing and mounted in front of the reflector;
b) a drop knuckle assembly coupled to the lamp head assembly, the drop knuckle assembly further comprising a knuckle housing, a ball member, at least one aperture extending through the ball member, a socket member pivotally and rotatably cooperating with the ball member, a link shaft having a first end and a keyed second end, a corresponding key socket defined by the aperture of the ball member for receiving the second end of the link shaft, a first rotational stop member connected to the first end of the link shaft at a location remote from the ball member and socket member, and a second rotational stop member located on the knuckle housing, the second stop member positioned and adapted to interfere with the first rotational stop member whereby rotation of the first rotational stop member, and correspondingly the ball member, about a longitudinal axis of the link shaft is limited by the interference between the first rotational stop member and the second rotational stop member; and c) an electrical cable disposed within the at least one ball joint aperture, the electrical cable operationally communicating with the bulb and extending from the bulb to an electrical power source, whereby the lamp head assembly is infinitely articulatable with respect to the drop knuckle assembly within the range of motion of the ball, and the ball member is rotatable less than 360 degrees about its own axis to minimize twisting damage to the electrical cable.

11. The articulating dental operatory light of claim 10, further comprising at least one mounting arm coupled to and cooperating with the drop knuckle assembly.

12. The articulating dental operatory light of claim 10, further comprising at least one handle located on the lamp head assembly, whereby the lamp head assembly is manually positionable by manipulation of the at least one handle.

13. The articulating dental operatory light of claim 12, wherein the at least one handle located on the lamp head assembly is formed of and overmolded with a heat insulating material.

14. The articulating dental operatory light of claim 10, wherein the lamp head assembly further comprises a light reflector having a concave shape and a light reflective surface for reflecting a substantial portion of visible light from the bulb in a predetermined pattern, and for allowing infrared and other undesirable energy to pass through the reflector.

15. The articulating dental operatory light of claim 14, wherein the light reflective surface further comprises a dichroic coating.

16. The articulating dental operatory light of claim 10, wherein the lamp head assembly further comprises at least one thermal insulator located between the light bulb and the lamp housing for limiting emission and transfer of heat energy from the bulb to the lamp housing.

17. The articulating dental operatory light of claim 10, wherein the ball member further comprises an attachment portion that is engageable with a receiver of the lamp head assembly forming at least a second joint whereby the lamp head assembly is additionally pivotable and adjustable.

18. The articulating dental operatory light of claim 10, wherein the lamp housing is formed of a single piece of material integrating at least one handle.

19. An articulating dental operatory light comprising:
a) a lamp head assembly further comprising a lamp housing, a light emitting bulb disposed within the lamp housing, at least one thermal insulator located between the light emitting bulb and the lamp housing, a light reflector affixed to the lamp housing proximate to the light emitting bulb, the light reflector having a light reflective surface further comprising a dichroic coating, at least one handle located on the lamp housing, the at least one handle being overmolded with a heat insulating material;
b) a drop knuckle assembly coupled to the lamp head assembly, the drop knuckle assembly further comprising a knuckle housing, a ball member, at least one aperture extending through the ball member, a socket member pivotally and rotatably cooperating with the ball member, a link shaft having a first end, a keyed second end and a link shaft aperture extending from the first end to the second end, a corresponding key socket defined by the aperture of the ball member for receiving the second end of the link shaft, a first rotational stop member connected to the first end of the link shaft at a location remote from the ball member and socket member, and a second rotational stop member located on the knuckle housing, the second stop member positioned and adapted to interfere with the first rotational stop member whereby rotation of the first rotational stop member, and correspondingly the ball member, about a longitudinal axis of the link shaft is limited by the interference between the first rotational stop member and the second rotational stop member, the ball member having an attachment portion that is engageable with a receiver of the lamp head assembly forming at least a second joint;
c) a tensioning collar adjustably engageable with the knuckle housing and at least one compressible O-ring formed of a high-durometer, heat-resistant material located and positioned to operationally engage the ball member, whereby tension of the socket member against the ball member is adjustable;
d) an electrical cable for carrying electrical current from a power source to the light emitting bulb, the electrical cable being disposed within the at least one aperture of the ball member and extending through the link shaft aperture, the electrical cable operationally communicating with the bulb and extending from the bulb to an electrical power source, whereby the lamp head assembly is infinitely articulatable with respect to the drop knuckle assembly within the range of motion of the ball member, and the ball member is rotatable less than 360 degrees about its own axis to minimize twisting damage to the electrical cable; an d whereby the lamp head assembly is pivotably adjustable with respect to the drop knuckle assembly at the at least a second joint.

20. The articulating dental operatory light of claim 19, wherein temperature of the light emitting bulb is controlled by ambient air flow through a plurality of vent openings in the lamp head assembly.

* * * * *